Patented May 8, 1934

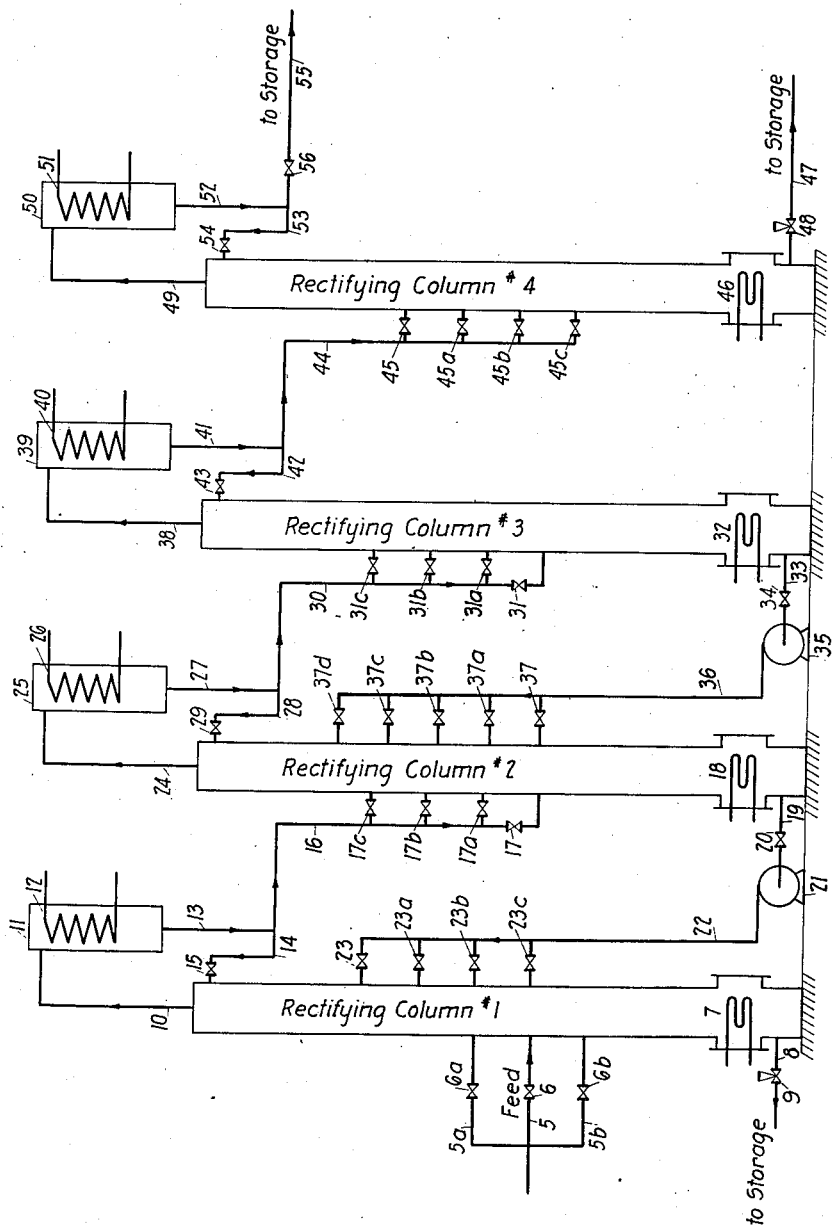

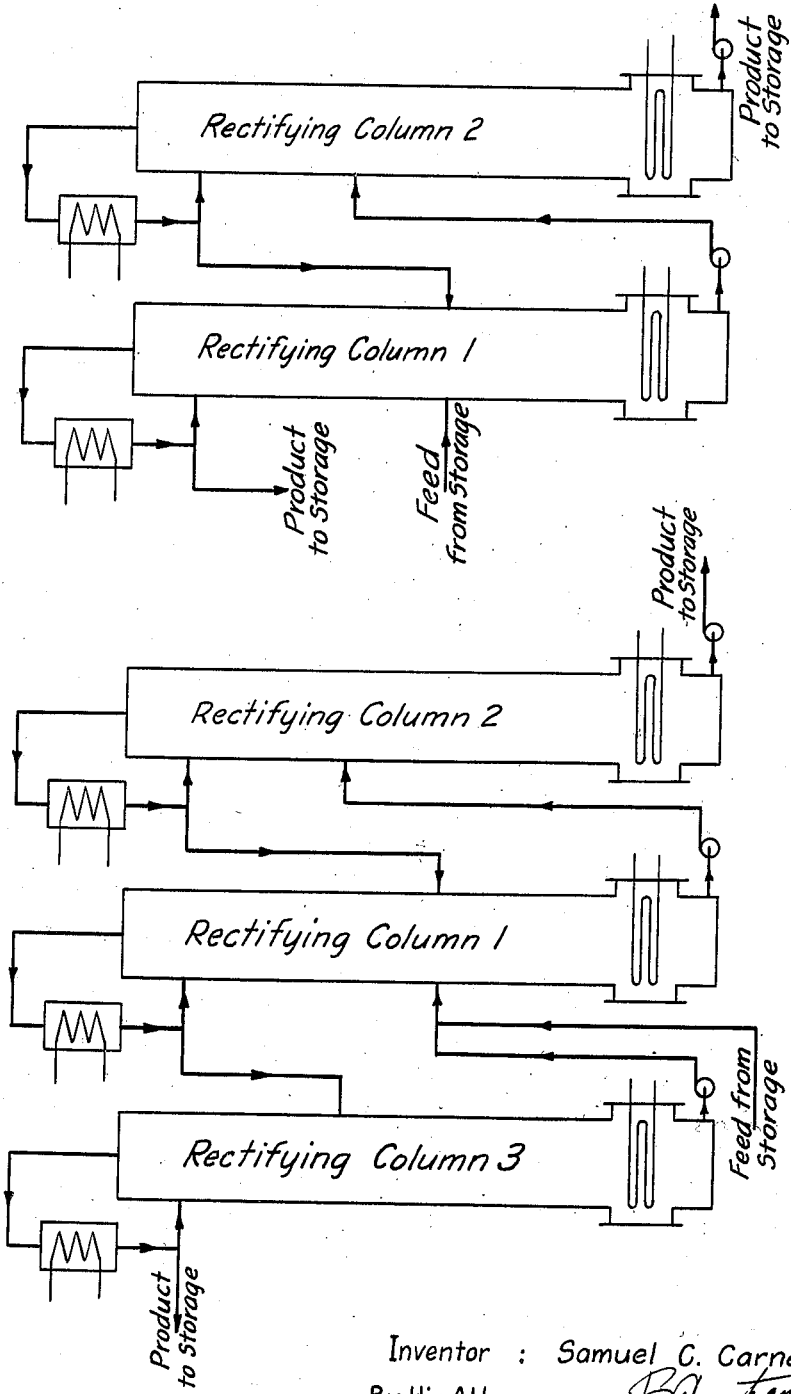

1,957,818

UNITED STATES PATENT OFFICE 1,957,818

PROCESS OF RECTIFICATION

Samuel C. Carney, Berkeley, Calif., assignor to Shell Development Company, San Francisco, Calif., a corporation of Delaware Application July 29, 1931, Serial No. 553,825

5 Claims. (Cl. 196—11)

This invention relates to the rectification of liquids and more specifically to the rectification of mixtures of hydrocarbons though not necessarily confined thereto.

This method of fractionation is applicable to the fractionation of any mixture which can be fractionated, such as hydrocarbon mixtures, mineral oils, products of destructive distillation of organic matter, fermentation products, such as: alcohols, organic acids, esters, etc., mixtures or solutions of distillable (not azeotropic) chemical substances either synthetic or otherwise produced or found in nature, etc.

The object of the invention is to provide a method of rectification, whereby a definite liquid chemical compound is produced substantially pure.

My invention is particularly adapted to the rectification of light hydrocarbon products containing olefines derived from cracking petroleum oils and produces a certain definite olefine or certain definite olefines in a substantially pure condition. Heretofore by the conventional methods and system of rectification, it has been impossible to produce a substantially pure product consisting of definite olefines.

In the process of manufacturing alcohols from olefines, contained in cracked petroleum products it is particularly desirable to use a pure definite olefine to obtain a pure alcohol. If the raw olefine material contains variable proportions of the active olefines and other chemically active ingredients, this process results in a chaotic complexity of reaction products. As most commercial alcohol products consist of such complex mixtures of alcohols, it reveals the fact that the methods of rectification, used in the refinery practice as hitherto known, are insufficient for preparing materials suitable for the efficient manufacture of alcohols, because they are not able to separate the different olefines sharply enough.

My new process of rectification operates with sufficient accuracy to obtain a product which eliminates the major part of the difficulties in making alcohols from olefines and permits simplification of that process and gives an excellent yield and a product of high purity.

Though applicable in general to the rectification of liquids, as illustration of the method of my invention, I shall describe its use in producing from commercially cracked petroleum products, a mixture of A-butylene and isobutylene with a minimum of isobutane and normal butane, especially suitable for the manufacture of secondary butyl alcohol.

As is known in the art of petroleum cracking, and the manufacture of alcohols from olefines contained in cracked products, there are available, either as vapors or as liquids, very large quantities of hydrocarbons ranging from methane to hexanes and hexylenes inclusive, the higher hydrocarbons usually being separated by the present conventional rectifying methods. The chief hydrocarbons, and their boiling points, contained in such lighter conventionally rectified petroleum products are:

| | Boiling point |
|---|---|
| Methane | −160 °C. |
| Ethane | −86 °C. |
| Ethylene | −103 °C. |
| Propane | −45 °C. |
| Propylene | −49 °C. |
| Isobutane | −11 °C. |
| Isobutylene | −6 °C. |
| A butylene | −5 °C. |
| Normal butane | +1 °C. |
| Trans B butylene | +¾ °C. |
| Cis B butylene | +3 °C. |
| Pentane | +36.3° C. |
| Amylenes | +31–42 °C. |

In some modern refineries, equipped with special rectifying equipment variously known as stabilizers, debutanizers or desulphurizers, from this lighter material ranging from methane to amylene, a fraction is obtained comprising the six butanes and butylenes as listed below together with various small amounts of propane and/or pentane and their homologous olefines. This material is the starting material in the example of my invention described below.

My invention provides a process to produce for example from this starting material a material containing 80% or more of A- and isobutylene, the remainder being either isobutane or normal butane or both. In actual practice on commercial scale a product of 92% of A- and isobutylene has been produced. The total sulfur content of this product produced in my process of rectification is from .02% to .05% by weight as against .3% by weight or higher of the feed.

Excluding negligible minor ingredients, the principal components, and their boiling points of the starting material are as follows:

| | Boiling point |
|---|---|
| Isobutane | −11° C. |
| Gamma or isobutylene | − 6° C. |
| A butylene | − 5° C. |
| Normal butane | + 1° C. |
| Trans B butylene | +¾° C. |
| Cis B butylene | + 3° C. |

It will be noted that propane, the next lighter fraction, has a boiling point of −45° C., while the amylenes, the next heavier fraction, start at 31° C., so that it is comparatively easy to separate these substantially from the butane-butylene fraction, but the difficulty overcome by my invention rests in obtaining A and isobutylene or the B butylenes separately from this fraction.

Before discussing further rectification of this fraction, reference is had to the accompanying drawings, from which my invention may be more readily understood. The drawings are diagrammatic views of apparatus by which the process of my invention may be performed.

In the drawings, Fig. 1 represents a rectifying column receiving a feed inlet pipe 5, 5a and 5b, controlled by valve 6, 6a and 6b, and coming from a source not shown. The lower end of column 1 is provided with heating element 7 and the bottom is provided with an outlet pipe 8 controlled by a level control valve 9 and going to a storage tank not shown. The top of column 1 is provided with a vapor line 10 going over into a reflux condenser 11 having a cooling coil 12 and a bottom connection 13. Pipe 13 terminates into a T dividing into a reflux line 14 controlled by valve 15 and connected with column 1. Branch 16 controlled by valve 17, 17a, 17b and 17c connects to different points of rectifying column 2. This column has at the lower end a heating element 18 and is provided with bottom outlet pipe 19 controlled by the valve 20 going over to the suction of a pump 21 which discharges through a pipe 22 controlled by valve 23, 23a, 23b and 23c into rectifying column 1. The top of rectifying column 2 is provided with a vapor pipe 24 connecting to a reflux condenser 25 having a cooling coil 26 and a bottom outlet pipe 27. Pipe 27 branches into a reflux line 28 controlled by valve 29 and connecting to rectifying column 2. Branch 30 controlled by valve 31, 31a, 31b and 31c connects with rectifying column 3. This column is provided with the heating element 32 at the lower end and has a bottom outlet pipe 33 controlled by valve 34 and going over into the section of pipe 35 discharging into a line 36 controlled by valve 37, 37a, 37b, 37c and 37d and going over into rectifying column 2. The top of rectifying column 3 is provided with a vapor outlet pipe 38 connecting to a reflux condenser 39 provided with a cooling coil 40 and having a bottom outlet pipe 41. The bottom outlet pipe 41 branches into a reflux line 42 controlled by a valve 43 and connecting to rectifying column 3. Branch 44 controlled by valve 45, 45a, 45b, and 45c connects to rectifying column 4. This column is provided with heating element 46 and a bottom outlet pipe 47 controlled by a liquid level control valve 48 and going to a storage not shown. The top of column 4 is provided with a vapor line 49 connected to a reflux condenser 50 having cooling coil 51 and a bottom outlet pipe 52. Bottom outlet pipe 52 branches into a reflux line 53 controlled by a valve 54 and connected to column 4. Branch 55 controlled by valve 56 goes to a storage tank not shown.

With apparatus as shown in the drawings, my process for further rectifying the fraction, ranging from isobutane to Cis B butylene inclusive, is performed as follows:

The feed, containing the six butane-butylene components as mentioned before, is drawn from a source not shown and introduced thru pipe 5 controlled by valve 6 in rectifying column 1 at a point where the liquid on the plate corresponds with the composition of the feed. The vapors from column 1 are condensed and the condensate divided according to requirements into reflux for column 1 and feed for column 2, as controlled manually by valves 15 and 17 respectively. The quantity of reflux depends entirely upon the separation to be made in the step under consideration. I prefer to use an automatic column control based on the temperature gradient in the column which maintains a constant difference in temperature between the top of the column and a selected point considerably lower, by controlling the amount of reflux to column 1 or respectively the feed to column 2; a change in difference of these two temperatures operates a valve in the reflux or feed line. The top product of column 1 is taken as liquid and flows by pressure difference as feed to a desired point of column 2. The bottom product of column 1, drawn off below the heating element 7, and comprising the heavier B butylenes and a part of the normal butane, not desired in this example, is pumped to storage. The bottom product of column 2, the "feed-back" liquid for column 1, contains a higher concentration of the desired A and isobutylenes than the original raw material but a lower concentration than the top product of column 1 and for this reason is introduced in accordance with its composition at a point in column 1 located between the entrance of the original feed and the top plate at which point the liquid on the plate corresponds in composition to the "feed-back" liquid. Provisions are made to enable the operator thru the manipulation of various valves to introduce this feed-back liquid at the correct point of column 1, thus intensifying the concentration of the A and isobutylenes in the top of column 1. The vapors leaving column 2 are condensed and the condensate divided into reflux for column 2 and feed for column 3 in the same manner and for the same reason as described heretofore at column 1. The flow of condensate is established and maintained due to the pressure difference between the two columns.

The bottom product of column 3 contains a higher concentration of the desired A and isobutylenes than the feed to column 2 and a lower concentration than the top product of column 2 and this "feed-back" liquid is introduced into column 2 at a point in accordance with its composition and located somewhere between the entrance of the feed line to column 2 and the top. This feed-back liquid again intensifies the A and isobutylenes in the column, resulting in a product of higher concentration. The vapors leaving column 3 are condensed and the condensate divided between column 3 and column 4 as described before.

The feed to column 4 flows by pressure difference and enters at a point usually high above the bottom of the tower, to obtain a sufficiently large safety factor in eliminating as top product substantially all isobutane with a minimum amount of isobutylene, thus producing a highly concentrated fraction of the desired A and isobutylenes as bottom product of the column.

The vapors leaving column 4 are condensed and part of the condensate is used as reflux for column 4 while the balance goes to storage.

For illustration a table is given showing an example of operating temperatures and pressures with the A and isobutylene content of the top and bottom products of each column, all figures being approximate and only illustrative. The feed used in this example contains 40–45% butylenes, of which 20–25% comprises the desired lighter A and isobutylenes and 20% the heavier B butylenes, which are eliminated.

|  | Column temp. °F. | Column pressure | A. and isobutylene |
| --- | --- | --- | --- |
|  |  | Lbs. | Percent |
| Top product 1 | 206 | 210 | 55-60 |
| Bottom product 1 | 217 |  | 0-5 |
| Top product 2 | 190 | 170 | 65-70 |
| Bottom product 2 | 193 |  | 50-55 |
| Top product 3 | 152 | 110 | 70-80 |
| Bottom product 3 | 156 |  | 60-65 |
| Top product 4 | 126 | 95 | 20-30 |
| Bottom product 4 | 136 |  | 80-90 |

It is known that a commercial column, even a very efficient one with many plates, cannot concentrate these olefines to a high percent; however, in such a column it is quite well possible to produce a fraction containing a higher percentage of desirable olefines than the original feed and thus preparing a feed of higher concentration for the next rectifying column to which it is connected. This second column in turn prepares and produces a fraction of still higher butylene content and by this method, it is possible to increase by steps the concentration of the butylene fraction.

The drawings show an apparatus comprising four columns; however, I do not wish to limit my process to this specific number and a larger or smaller number of columns may be used, representing a larger or smaller number of steps and depending upon the product desired.

I also prefer to use, for this extremely selective rectification, columns equipped with my method of establishing inherent stability as described in my copending patent application Serial No. 539,718; however, I do not wish to limit myself hereto, as my process may be performed in a plurality of any efficient column of the conventional type.

From the foregoing illustration and description, it is clear that in my process, any desired fraction or single hydrocarbon can be obtained from a raw material. I use the principle of preparing the raw material in one column and producing there a product from which it is possible to obtain in a subsequent column or columns the desired fraction by rectification. This method succeeds because it is easier to obtain all of a component, if some of the next heavier or lighter be permitted to go with it as occurs in column 1, disregarding purity to obtain larger yield; and it is easier to obtain a product in purity from a feed containing a high percentage of the desired fraction if it is not required to obtain all of the desired fraction from the feed, disregarding yield to obtain highest purity.

The progressively decreasing pressure from column 1 to column 4 may be reversed, in which case the feed back from one column to the preceding one flows by pressure difference between the columns, while the feed from one column to the next one has to be pumped. In fact the columns may be operated under any combination of progressively increasing or decreasing pressures.

In the illustrative example mentioned, an intermediate fraction of the given material was desired, but it will be understood that in case the top fraction of a given material is desired, the desired produced would be produced as top product of column 4, while the bottom production of column 4 would be fed back to column 3 in a similar manner as heretofore described.

Figs. 2 and 3 of the drawings show two different arrangements of back feed circuits in a fractionating system.

Fig. 2 is an illustration of a process of multistage rectification in which column 1 receives the raw material from storage, while column 2 produces a top product of substantially the same composition as the raw material and therefore is fed back to column 1 at the same point as the feed from storage. The feed back of this product may be introduced at any point of column 1, in accordance with its composition.

Fig. 3 is an illustration of a process of multistage rectification, in which column 1 receives the feed from storage and column 2 produces, from the bottom product of column 1, a top product having the same composition as the raw material and therefore is fed back to column 1 at the same point as the feed from storage. Column 3 receives the top product from column 1 as feed and produces a bottom product having the same composition as the raw material, which therefore is fed back to the same point as the feed to column 1. It is understood that in this fractionating system, the top product and bottom product back feed are introduced into this preceding column at a point where the liquid of the column is in accordance with the composition of the back feed material. In this system, as in any other herein described, the points of reintroduction of either top or bottom back-feed are determined by its composition. It is preferable to reintroduce the back-feed into a column near the plate which contains liquid having a composition corresponding to that of the back-feed. In the appended claims such points are referred to as corresponding points.

In my process of multistaged rectification based on the back feed principle, I may employ the top product or bottom product back feed circuit depending upon the desired rectification. If selective rectification of the ascending material of the first column is desired, I employ the bottom back feed circuit as shown between columns 1 and 3 of Fig. 3 and in case selective rectification of the descending material of the first column is desired, I employ the top product back feed circuit. In the former operation, the desired product is produced as top product from a column, and in the latter as bottom product. With the first column of a rectification system is meant the column, which receives the raw material from storage as feed.

In Fig. 1 of the drawings, the ascending material of column 1 is further rectified in columns 2 and 3 having the bottom back feed circuit while producing the rectified product as top product of column 3. The desired product however, is an intermediate fraction of the raw material of column 1 and is the higher boiling fraction of the top product of column 3. This top product is thus in turn rectified in column 4 and, as in the example, one tower is sufficient to accomplish the separation of the lighter fraction from the heavier fraction, the desired product is produced as bottom product from tower 4. In case the desired fractionation can not be obtained in column 4 alone, additional columns have to be added, forming with column 4 a rectification system in which this column is operated as the first column of this system and as further rectification of the descending material of column 4 is desired, the additional columns have to operate with a top product back feed circuit while the desired fraction is produced as bottom product of the last column.

I claim as my invention:

1. In a process of fractionating a fluid mixture in a series of stages for production of the desired product, the steps which comprise fractionating said mixture at one stage, thereby concentrating said product in one portion of the mixture, diminishing its content in the other separate portion of the mixture, and forming and maintaining a series of mixtures having intermediate compositions, separately withdrawing said two portions from this stage of the process, subjecting the first portion of the mixture to a further fractionation in the second stage, whereby a secondary concentrate of the product and a secondary portion with the diminished content of the product and having a composition intermediate of those of the first two portions of the mixture are obtained, and returning at least a part of the said secondary portion to the corresponding point of the first stage of the process.

2. The process of fractionation wherein the secondary concentrate obtained in accordance with the claim 1 is further fractionated to recover a product of higher purity.

3. In a process of fractionating a fluid mixture in a series of stages for production of a relatively low boiling product the steps which comprise fractionating said mixture at one stage, thereby concentrating said product in one relatively low boiling portion of the mixture, diminishing its content in the other separate relatively high boiling portion of the mixture, and forming and maintaining a series of mixtures having intermediate compositions, separately withdrawing said two portions from this stage of the process, subjecting the first portion of the mixture to a further fractionation in the second stage, whereby a secondary relatively low boiling concentrate of the product and a secondary relatively high boiling portion with the diminished content of the product and having a composition intermediate of those of the first two portions of the mixture are obtained, and returning at least a part of the said secondary portion to the corresponding point of the first stage of the process.

4. In a process of fractionating a fluid mixture in a series of stages for production of a relatively high boiling product the steps which comprise fractionating said mixture at one stage, thereby concentrating said product in one relatively high boiling portion of the mixture, diminishing its content in the other separate relatively low boiling portion of the mixture, and forming and maintaining a series of mixtures having intermediate compositions, separately withdrawing said two portions from this stage of the process, subjecting the first portion of the mixture to a further fractionation in the second stage, whereby a secondary relatively high boiling concentrate of the product and a secondary relatively low boiling portion with the diminished content of the product and having a composition intermediate of those of the first two portions of the mixture are obtained, and returning at least a part of the said secondary portion to the corresponding point of the first stage of the process.

5. In a process of fractionating a fluid mixture in a series of stages for production of one relatively low and the other relatively high boiling products, the steps which comprise fractionating said mixture at one stage, thereby concentrating the two products separately in two different portions of the mixture and forming and maintaining a series of mixtures of intermediate compositions, separately withdrawing said two portions from this stage of the process and subjecting them to further fractionation in separate stages, thereby producing two corresponding relatively low and high boiling secondary concentrates of the products and two portions of the original mixture having intermediate compositions, and returning at least a part of at least one of said two portions to the corresponding points of the first stage of the process.

SAMUEL C. CARNEY.